United States Patent

Carriere et al.

[15] 3,666,969

[45] May 30, 1972

[54] DEVICE FOR CLIPPING ELECTRICAL SIGNALS

[72] Inventors: Christian Carriere, 75 Paris; Roger Dupont, 91 Evry, both of France

[73] Assignee: Commissariat a L'Energie Atomique.

[22] Filed: Nov. 16, 1970

[21] Appl. No.: 89,761

[30] Foreign Application Priority Data

Nov. 21, 1969 France....................................6940054

[52] U.S. Cl...................................307/237, 328/169, 328/171

[51] Int. Cl...............................................................H03k 5/08

[58] Field of Search....................307/237; 328/169, 171, 168

[56] References Cited

UNITED STATES PATENTS

| | | | |
|---|---|---|---|
| 3,398,298 | 8/1968 | Baun | 307/237 X |
| 3,444,394 | 5/1969 | Colvson | 307/237 X |
| 3,523,198 | 8/1970 | Keller | 307/237 X |
| 3,603,811 | 9/1971 | Day et al. | 307/237 |
| 3,603,813 | 9/1971 | Hall | 307/237 |

*Primary Examiner*—Stanley T. Krawczewicz
*Attorney*—Cameron, Kerkam & Sutton

[57] ABSTRACT

The clipping device comprises a first field-effect transistor in which the grid terminal is connected to the emitter of a second transistor, the source terminal is connected to ground through a first resistor, the drain terminal is connected to a supply source and the clipped signal is available at the source terminal; a second transistor in which the emitter is connected to ground through a second resistor, the base is connected to the source terminal of the first field-effect transistor through a third resistor and the collector constitutes the input of the clipping circuit; a diode connected between the base of the second transistor and a second voltage source in a direction which causes the diode to cut-off when the base-ground voltage of the second transistor is lower at absolute value than the value of the voltage of the second voltage source.

2 Claims, 2 Drawing Figures

DEVICE FOR CLIPPING ELECTRICAL SIGNALS

This invention relates to devices for clipping signals.

Clipping devices of the simple diode type are already known. However, these devices have a low input impedance which varies to a considerable extent depending on whether the amplitude of the signal applied to their input is either higher or lower than the clipping threshold.

The aim of the invention is to provide a clipping device which has a high input impedance irrespective of the amplitude of the applied signal, which is capable of carrying a high input voltage and can advantageously be employed for electric signals of low power and high maximum voltage.

The present invention is directed to a clipping device which essentially comprises:

a first field-effect transistor whose grid terminal is connected to the emitter of a second transistor and whose source terminal is connected to ground through a first resistor while the drain terminal is connected to a supply source, the clipped signal being available at said source terminal;

said second transistor whose emitter is connected to ground through a second resistor while the base is connected to the source terminal of said first field-effect transistor through a third resistor and the collector of said second transistor constitutes the input of said clipping circuit;

a diode connected between the base of said second transistor and a second voltage source in a direction which causes said diode to cut-off when the base-ground voltage of said second transistor is lower at absolute value than the value of the voltage of said second voltage source.

The characteristic features and advantages of a device in accordance with the invention will be more clearly shown in the following description which is given by way of example, reference being made to the accompanying drawings which are given by way of illustration but not in any limiting sense and in which.

Figure 1:
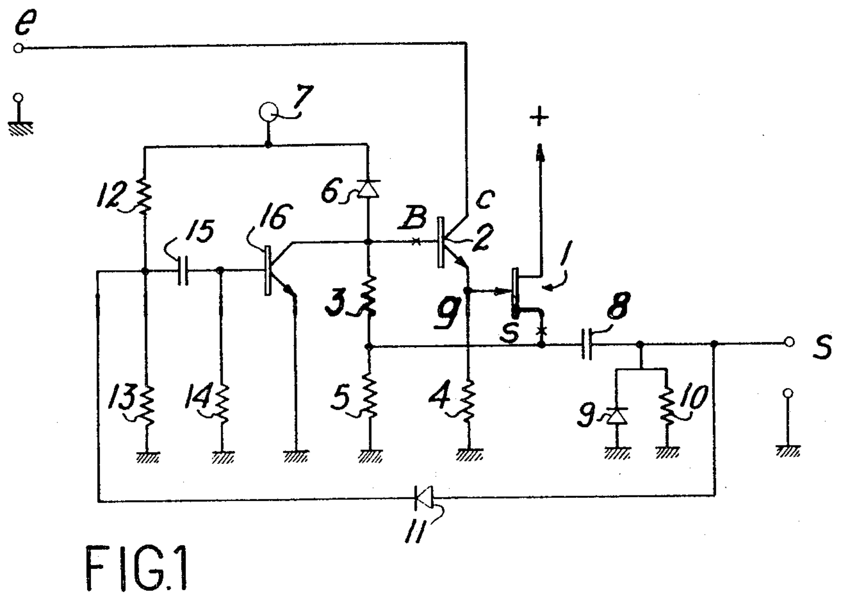
FIG. 1 is a detailed electrical diagram of a clipping circuit in accordance with the invention.

As illustrated in FIG. 1, the field-effect transistor 1 is mounted with a common source connection. The grid of transistor 1 is connected to the emitter of transistor 2; in consequence, the base-ground voltage $V_{bm}$ of the transistor 2 and the source-ground voltage $V_{sm}$ of the field-effect transistor 1 are in phase. Biasing of the transistor 2 is obtained by means of a feedback circuit by connecting the base of the transistor 2 to the source of the field-effect transistor 1 through a resistor 3. The circuit does not oscillate since the gain of the feedback loop is lower than 1. Biasing requires that the grid-source voltage $V_{gs}$ of the field-effect transistor 1 should be higher at absolute value than the base-emitter voltage $V_{be}$ of the transistor 2 and of opposite sign. In this example, the transistor 2 which is employed is of the n-p-n type and the transistor 1 is a field-effect transistor of N-channel type. However, this arrangement does not imply any limitation whatsoever and any pair of transistors conforming to the foregoing condition would be wholly suitable.

The emitter of the transistor 2 is connected to ground through the resistor 4; its collector constitutes the input of the clipping circuit. Irrespective of the input voltage $V_{cm}$ which is applied to the collector of the transistor 2, the grid-source voltage $V_{gs}$ of the field-effect transistor 1 is sufficient to maintain the transistor 2 in the saturated condition. The source terminal of the field-effect transistor 1 is connected to ground through a resistor 5 having a high value so as to maintain the voltage $V_{gs}$ at an approximately constant value. Among the different voltages, we have the following relation:

$$V_{om} = V_{sm} + V_{ce} + V_{gs}$$

The voltage $V_{ce}$ is the collector-emitter saturation voltage of the transistor 2. The variation of this voltage is of a low order and since the variation of the voltage $V_{gs}$ is equally low, it can be stated that the voltage $V_{sm}$ follows the variations of the input voltage $V_{cm}$ to within the nearest constant.

In order to obtain the desired clipping effect, a diode 6 is connected between the base of the transistor 2 and a voltage source 7. The direction of connection of the diode 6 is such that this latter is caused to cut-off when the base-ground voltage of the transistor 2 is lower at absolute value than the voltage $V_a$ of said voltage source 7. Thus, when the input voltage $V_{cm}$ exceeds the value $V_a$ as increased by the collector-base saturation voltage of the transistor 2, the current which is supplied to the base of the transistor 2 through the feedback loop is shunted through the diode 6 and the transistor 2 is caused to cut-off. The voltage $V_a$ establishes the clipping level of the device. The high input impedance is due to the high value of the resistor 4 which is placed in the emitter circuit of the transistor 2.

The circuit which is constituted by the capacitor 8, diode 9 and resistor 10 serves solely to transmit the leading edge of the pulse up the clipping level and to eliminate the continuous component of the signal as well as to eliminate the pulse supplied by the capacitor 8 when the transistor 2 is in the non-conducting state. The diode 11, the resistors 12, 13, 14, the capacitor 15 and the transistor 16 form a feedback circuit which is intended to accelerate the transition from the saturated state to the cut-off state of the transistor 2. The resistors 12 and 13 constitute a bias bridge which determines a voltage threshold above which the feedback is applied through the diode 11.

Figure 2:
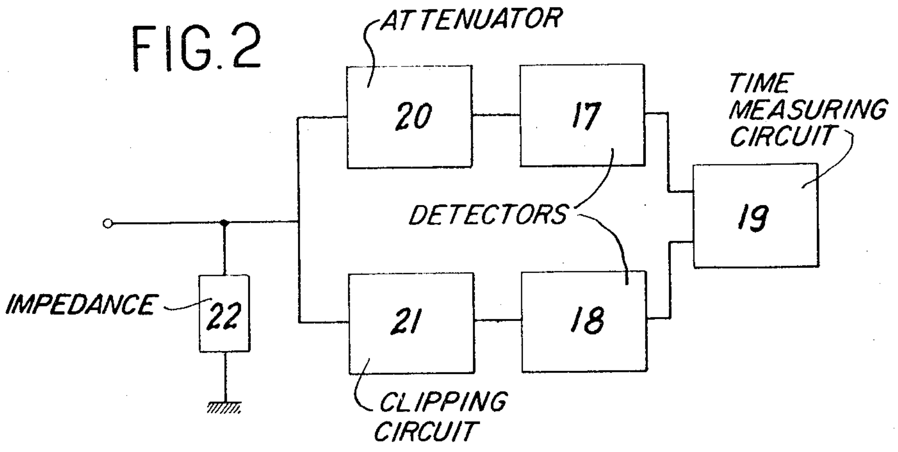
FIG. 2 illustrates a device for measuring the rise time or decay time of a high-voltage electrical pulse which makes use of the clipping device in accordance with the invention.

FIG. 2 shows a device for measuring the rise time or decay time of a high-voltage electrical pulse and entailing the use of a clipper according to the invention. This device comprises two threshold detectors 17 and 18 which detect the voltage levels corresponding, for example, to 90 and 10 percent of the amplitude of the pulse whose rise time or decay time is to be measured. Said detectors control a time-measuring circuit 19. Depending on the measurement to be taken, namely the measurement of the rise time or decay time, one detector closes the time-measuring circuit 19 while the other opens said circuit. An attenuator 20 placed opposite to the threshold detector 17 which detects a voltage level equal to 90 percent of the pulse amplitude makes it possible by virtue of its high input impedance and its attenuation coefficient to employ in the case of the detector 17 a threshold detector which has a low input impedance and does not carry a high input voltage. A clipping circuit 21 in accordance with the invention which is capable of carrying a high input voltage and has a high input impedance is placed opposite to the threshold detector 18 which must detect a voltage level equal to 10 percent of the pulse amplitude. In the case of the threshold detector 18, said circuit permits the use of a threshold detector of the same type as the detector 17 or, in other words, a threshold detector which does not necessarily have a high input impedance and cannot carry a high input voltage. The input of the attenuator 20 and of the clipping circuit 21 which are connected together constitute the input of the device. An impedance 22 which is placed between ground and the input of the device serves to match the input impedance of the device with that of the line which transmits the pulse.

What we claim is:

1. A clipping device essentially comprising:

a first field-effect transistor whose grid terminal is connected to the emitter of a second transistor and whose source terminal is connected to ground through a first resistor while the drain terminal is connected to a supply source, the clipped signal being available at said source terminal;

said second transistor whose emitter is connected to ground through a second resistor while the base is connected to the source terminal of said first field-effect transistor through a third resistor and the collector of said second transistor constitutes the input of said clipping circuit;

a diode connected between the base of said second transistor and a second voltage source in a direction which causes said diode to cut-off when the base-ground voltage of said second transistor is lower at absolute value than the value of the voltage of said second voltage source.

2. A clipping device according to claim 1 and essentially comprising:

a third transistor which is connected into a feedback circuit and the collector of which is connected to the base of said second transistor while the emitter is connected to ground and the base is connected to ground through a resistor;

a diode circuit constituted by a diode connected between the input of said diode circuit and the mid-point of a bias bridge formed of two resistors, the mid-point of said bias bridge being also connected through a first capacitor to the base of said third transistor, the input of said diode circuit being connected through a second capacitor to the source terminal of said first field-effect transistor, the direction of connection of the diode being such as to cause said diode to cut-off when the value of the voltage at the input of said diode circuit is lower at absolute value than the voltage at the mid-point of said bias bridge;

a rectifier circuit which is formed of a parallel-connected resistor and diode and which is connected between ground and the input of said diode circuit.

* * * * *